A. F. ROCKWELL.
VARIABLE SPEED COASTING AND BRAKING HUB.
APPLICATION FILED MAR. 1, 1904.

942,520.

Patented Dec. 7, 1909.
2 SHEETS—SHEET 1.

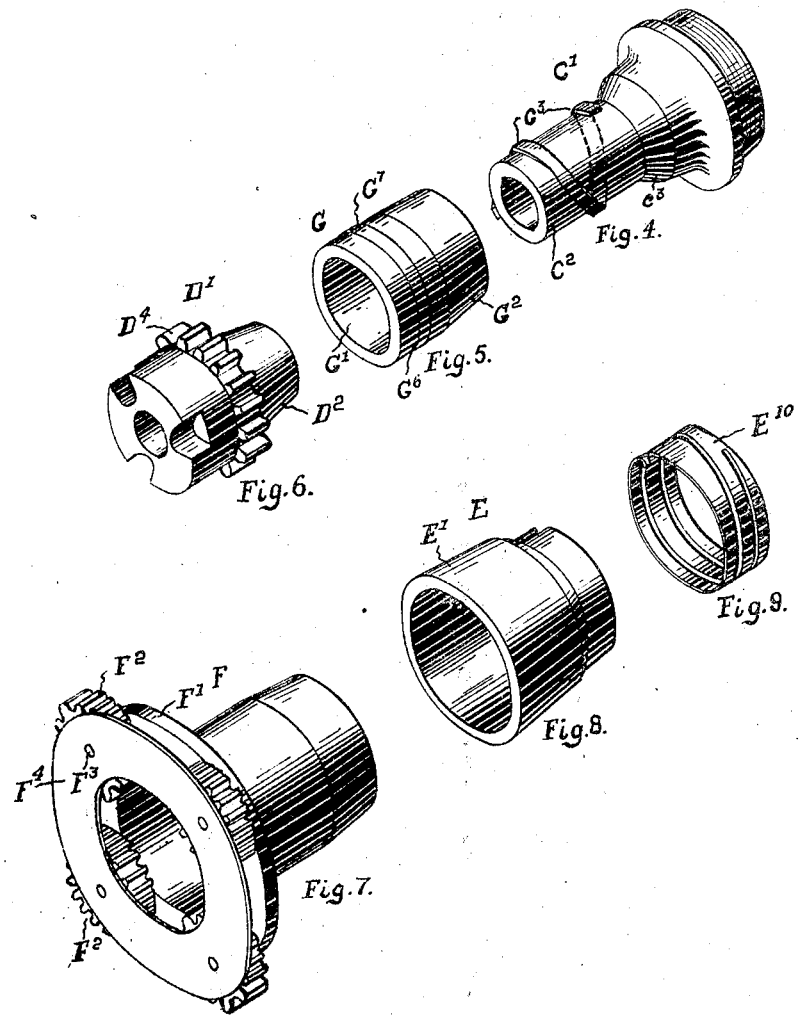

UNITED STATES PATENT OFFICE.

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

VARIABLE-SPEED COASTING AND BRAKING HUB.

942,520.     Specification of Letters Patent.     Patented Dec. 7, 1909.

Application filed March 1, 1904. Serial No. 196,037.

*To all whom it may concern:*

Be it known that I, ALBERT F. ROCKWELL, a citizen of the United States, residing at Bristol, in the county of Hartford and State of Connecticut, have invented certain new and useful Improvements in Variable-Speed Coasting and Braking Hubs; and I do hereby declare the following to be a full, clear, and exact description of the invention, such as will enable others skilled in the art to which it appertains to make and use the same.

The present invention relates to driving and brake mechanism for cycles and like vehicles and more particularly to a back pedaling, free coasting and braking hub provided with a variable speed driving gear.

In Letters Patent No. 745,524, granted to me on December 1, 1903, there is disclosed a free coasting and braking hub. In a construction of this kind the wheel hub when clutched to the driver is carried thereby at the same speed as that of the driver itself. It is desirable, however, that the ratio of the speed of the hub and the speed of the driver be variable, for the reason that less leverage is required by the rider when traveling along a level surface than when ascending an incline. It is also desirable that the mechanism for shifting from one speed to another be controlled by the rider through the pedals, in the same manner that the clutches for effecting driving, free coasting and braking are now controlled in coasting and braking hubs.

The object of the present invention is to provide a free coasting and braking hub with means controlled by the pedals for varying the ratio between the speed of the hub and the speed of the driver.

Further objects of the present invention will appear in connection with the following description thereof.

To the above ends the present invention consists in the devices and combinations of devices to be hereinafter described and particularly pointed out in the claims.

The present invention is illustrated in the accompanying drawings in which:—

Figure 1:
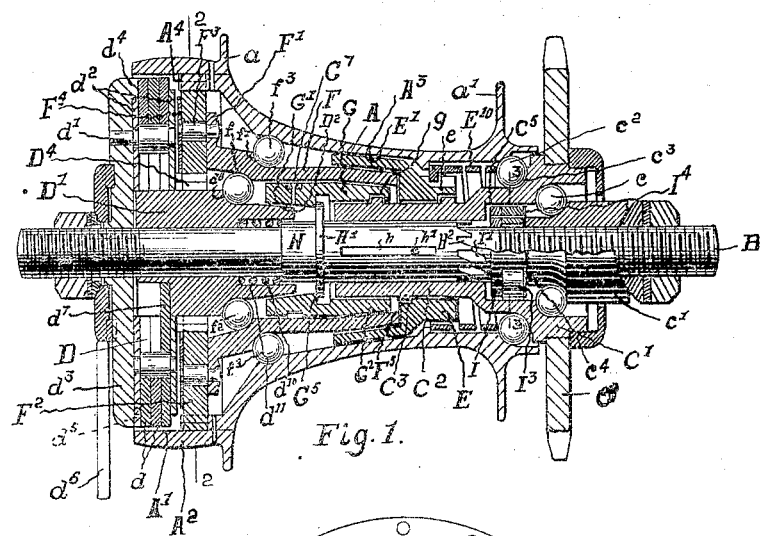
Figure 2:
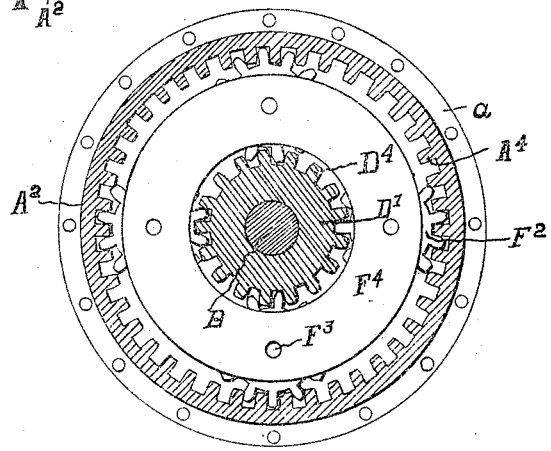
Figure 3:
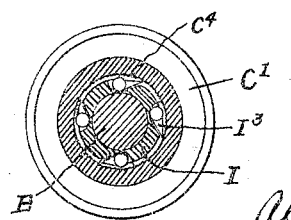

Figure 1 is a longitudinal section through a hub containing my improvements, showing all the parts assembled and in neutral positions. Fig. 2 is a cross section taken on line 2—2, of Fig. 1. Fig. 3 is a cross section taken on line 3—3, Fig. 1, and showing the relation of the driver sleeve to one member of the speed controlling clutch. Figs. 4, 5 and 6 show in perspective the driver, the intermediate clutch sleeve and the brake actuator. Figs. 7, 8 and 9 show in perspective the auxiliary driving sleeve carrying the planetary gears for engaging with gear teeth within the hub and upon the brake actuator, the clutch sleeve for engaging directly with the hub and the controller for said latter sleeve.

In the drawings, A indicates the hub shell having the usual flanges $a$ and $a^1$ for receiving spokes, and B represents the usual stationary axle supported within the rear fork of the bicycle and upon which the component parts of the hub mechanism are mounted.

C indicates the usual driving sprocket or gear located at one end of the hub and screwed or otherwise secured to the driver $C^1$, the driver being supported at one end upon balls $c$ seated upon a bearing on the cone $c^1$. One end of the hub shell is supported upon balls $c^2$ seated upon a bearing $c^3$ on the exterior of the driver. The sleeve $C^2$ of the driver extends well into the hub and is provided on its exterior with a screw thread or rib $C^3$. At the opposite end of the hub there is arranged suitable braking mechanism D, preferably of the type set forth in the patent previously referred to, and operated by means of the brake actuator $D^1$. The brake consists of a number of open spring rings $d$ adapted to be expanded against a braking surface $A^1$ within the brake drum $A^2$. The brake rings are held fixed at one end through their engagement with studs $d^1$ passing through the retaining plates $d^2$ and into the adjusting plate $d^3$. Lugs $d^4$ on the adjusting plate, which engage in notches $d^5$ in one of the retaining plates, serve to further secure and support the one end of the brake rings. The adjusting plate is in turn locked to a portion of the bicycle frame by means of the anchoring arm $d^6$. When the brake actuator $D^1$ is turned in one direction, the expanding levers $d^7$ act upon the free ends of the rings to expand the rings against the braking surface upon the hub shell; movement of the brake actuator in the other direction is prevented by reason of the fact that the expanding levers abut against the fixed ends of the brake rings.

A clutch sleeve E is mounted upon the driver sleeve and is provided with an internal spiral groove $e$ adapted to engage with the thread $C^3$ of the driver sleeve. The inner end of the clutch sleeve E is cup-shaped so as to form an external conical clutch face $E^1$, adapted to engage with a complementary clutch face $A^3$ within the hub shell, and to provide for the nesting of this sleeve with an auxiliary driving sleeve F and an intermediate clutch sleeve G. The clutch sleeve E has a sliding connection with the usual resilient ring-like clutch controller $E^{10}$.

Upon the forward rotation of the sprocket wheel the screw thread of the driver sleeve causes the clutch sleeve E to be moved laterally so as to bring its clutch face $E^1$ into engagement with the clutch face $A^3$ within the hub shell, thereby clutching the driver to the hub and causing the hub to move forward at the same rate of speed as that of the driver. When the sprocket wheel is rotated in a backward direction or when it is held stationary while the hub continues to rotate, the clutch sleeve E is unclutched from the hub shell, thereby permitting the wheel to run freely and independently of the driving mechanism.

In order that the brake may be applied upon the backward rotation of the driver through a definite angle, there is provided an intermediate clutch sleeve G which has an internal spiral groove $g$ also adapted to engage with the thread $C^3$ upon the driving sleeve. The intermediate clutch sleeve is formed with an interior flaring clutch face $G^1$ which coöperates with a complementary clutch face $D^3$ upon the brake actuator $D^1$. Consequently, upon the rotation of the driver in a backward direction, the clutch sleeve E will be moved laterally so as to become disengaged from the hub shell and the intermediate clutch sleeve will be likewise moved so as to bring its clutch face $G^1$ into engagement with the clutch face $D^2$ upon the brake actuator. A further backward turning of the driver will then cause the brake actuator to be likewise rotated, expanding the brake rings. A subsequent forward turning of the driver again releases the intermediate clutch sleeve from the brake actuator, thereby releasing the brake.

In order that the hub may be driven at a higher rate of speed than the speed of the driver, there is provided auxiliary driving mechanism, together with means for bringing it into play or rendering it inoperative. Briefly stated, this auxiliary driving mechanism comprises a series of planetary gears supported upon an element which is adapted to be clutched to and unclutched from the driver sleeve, said gears engaging respectively with teeth upon a fixed support and teeth upon the interior of the hub shell, whereby, when the supporting element is clutched to the driver sleeve, the hub shell is driven from the planetary gears, causing it to revolve at a greater rate of speed than that of the driver and driver sleeve.

The auxiliary driving mechanism consists of a sleeve F flanged at one end, as at $F^1$, and provided with internal and external seats, $f$ and $f^1$, which engage respectively with balls $f^2$ and $f^3$, the inner set of balls resting upon a suitable bearing $d^8$ upon the brake actuator $D^1$ and the outer set of balls $f^3$ serving to support one end of the hub shell. Journaled upon the flange $F^1$ are a series of pinions $F^2$, there being four of these pinions shown in the drawing, but the number may, of course, be varied. These pinions are mounted upon stub shafts $F^3$, one end of each of which is riveted to the flange $F^1$ and the other end to an annular retaining plate $F^4$, this construction enabling the auxiliary driving sleeve to be removed from the hub without disarranging the pinions.

The brake actuator $D^1$ is provided with gear teeth $D^4$ extending about its circumference, and the interior of the hub shell adjacent the brake surface is provided with similar teeth $A^4$, the teeth upon the brake actuator and upon the hub shell meshing with the teeth of the pinions $F^2$.

If the hub shell is free and the auxiliary driving sleeve is rotated, the hub shell will rotate at a higher rate of speed than that of the sleeve, for the reason that the linear velocity of the toothed portion of the hub shell is equal to twice the rolling velocity of the teeth upon the pinions, in addition to the velocity which they would have if the hub were clutched directly to the driver; since the brake actuator acts as a rigid support about which the pinions travel and the hub shell in turn rolls upon the pinions.

The auxiliary driving sleeve F is driven by means of the driver $C^1$ and its sleeve $C^2$ through the intervention of the intermediate clutch sleeve G. When otherwise free, the intermediate clutch sleeve G is moved laterally upon a forward rotation of the driver, so as to bring its clutch face $G^2$ into engagement with an internal clutch face $F^5$ of the auxiliary driving sleeve. A continued forward movement of the driver then operates to impart a like movement to the auxiliary driving sleeve, thereby rotating the hub shell in the manner heretofore described. Upon the cessation of the forward movement of the driver and a slight retrograde movement thereof, the intermediate clutch sleeve G is again shifted toward the brake actuator and out of engagement with the clutch face of the auxiliary driving sleeve, thereby permitting this sleeve to ride idly by reason of the forward movement of the hub. During the driving of the hub at the high speed the clutch E is rendered inoperative by reason of the fact that the hub shell is traveling at a higher rate of speed than that of the clutch sleeve; consequently the moment the clutch face $E^1$ contacts with the clutch face $A^3$ the clutch sleeve will be rotated in a forward direction, namely in the direction which unscrews it from the driver sleeve and out of operative engagement with the hub shell.

It is evident that unless some means were provided for restraining the intermediate clutch sleeve G, it would be moved laterally at all times so as to engage with the auxiliary driving sleeve upon a forward rotation of the driver. It is therefore necessary to provide some means, under the control of the rider, for preventing the intermediate clutch sleeve from coming into clutching engagement with the auxiliary driving sleeve when it is desired to drive the hub shell directly from the driver by means of the clutch sleeve E. To this end there is provided a fixed stop for preventing lateral movement of the intermediate sleeve when desired, which stop may be withdrawn in order to permit lateral movement of said sleeve. This stop consists of a tube H having the annular flange $H^1$ which is supported upon the axle and within the driver sleeve. The tube is slotted as at $h$, and a pin $h^1$, which projects from the axle B through this slot, permits the tube to have a sliding movement along the axle, but not a rotative movement thereof. The flange $H^1$ is adapted to abut against an internal shoulder $G^5$ upon the intermediate clutch sleeve. At the opposite end of the tube are formed a series of ratchet teeth $H^2$, these teeth being cut into the edge of the tube so as to mesh with corresponding teeth $I^1$ upon the controller I. The teeth $H^2$ and $I^1$ are constructed so as to have broad end faces, whereby a considerable bearing surface is provided between the respective teeth when they are out of mesh and one set of teeth abuts against the ends of the other. In Fig. 1 of the drawing, these teeth are illustrated as being out of interlocking engagement and as abutting against each other. In this position the flange $H^1$ of the tube H engages the shoulder $G^5$ of the intermediate clutch sleeve so as to prevent the sleeve from moving laterally into clutching engagement with the auxiliary driving sleeve; and, since the controller I abuts against the cone $c^1$ screwed upon the axle, the sleeve H in this position affords a perfectly rigid stop for holding the intermediate clutch sleeve inoperative. By rotating the controller I so as to permit the teeth $H^2$ and $I^1$ to position themselves to become interlocked, the intermediate clutch sleeve is released, whereupon it may be moved laterally to engage with the auxiliary driving sleeve.

In order that the lateral shifting of the tube H need not be performed by the intermediate clutch sleeve, there is provided a spring $d^{10}$ seated within a recess $d^{11}$ in the end of the brake actuator $D^1$. As soon, therefore, as the controller I is shifted from the position shown in Fig. 1 to a position in which the teeth $I^1$ and $H^2$ may interlock, the spring $d^{10}$ forces the tube H laterally for a distance equal to the depth of these teeth.

The controller I is operated by the driver. The interior of the driver sleeve contains a series of fine teeth $C^4$ which extend longitudinally within the recess $C^5$. These teeth are designed to coöperate with a pawl or pawls $I^3$ carried by the controller I. When the driver and driver sleeve are turned backwardly, the pawls $I^3$ are engaged by the teeth $C^4$ within the sleeve and the controller turns with the sleeve.

During the ordinary propelling of the hub, the controller I is in the position indicated in Fig. 1. If it is desired to coast, the operator merely holds the pedals stationary. If it is desired, on the other hand, to bring into play the auxiliary driving mechanism, the pedals are turned backward slightly so as to shift the controller I sufficiently to permit the spring $d^{10}$ to throw the tube H laterally to release the intermediate clutch sleeve. Upon forward pedaling again the thread $C^3$ upon the driver sleeve shifts the intermediate clutch sleeve so as to clutch it to the auxiliary driving sleeve F, and upon the further forward movement of the pedals, the hub shell is driven, not directly from the driver, but at an increased speed with relation thereto. If, instead of desiring to bring into play the auxiliary driving mechanism, it is the desire of the rider to apply the brakes, then a further backward movement of the pedals after the tube H had been shifted laterally will cause the teeth $H^2$ to ride up the inclined faces of the teeth $I^1$, bringing these parts again into the same relative positions shown in Fig. 1, while at the same time the intermediate clutch sleeve will have been shifted laterally into clutching engagement with the brake actuator, clutching it to the driver sleeve and causing it to be turned with the driver to apply the brakes. When it is desired to release the brakes, the pedals are rotated in a forward direction, the controller I remaining stationary, however. The intermediate clutch sleeve G is thereby shifted laterally out of engagement with the brake actuator and continues its lateral movement until the shoulder $G^5$ comes into contact with the flange H¹, whereupon the further lateral movement of the sleeve is prevented. During the further rotation of the driver sleeve to effect the clutching engagement between the sleeve E and the hub shell, the intermediate clutch sleeve revolves with the driver sleeve. The intermediate clutch sleeve G is grooved in its outer surface as at G⁶ and, seated within this groove is an open spring ring or band G⁷ which projects slightly beyond the surface of the sleeve and binds upon the interior of the auxiliary driving sleeve F, serving as a controller to present resistance to the turning of the intermediate clutch sleeve when it is desired to shift said sleeve laterally by means of the screw threaded driver sleeve. The controller I may be roughened on the face adjacent the face of the cone c¹, but preferably the meeting faces of the controller and cone are provided with fine teeth I⁴ and c⁴, the object of this arrangement being to prevent the controller from being jarred out of position when it is set to lock the intermediate clutch sleeve; it being understood that the spring d¹⁰ acting through the tube H, presses the controller I against the cone c¹ so as to cause an intermeshing of the teeth between the controller and cone.

The operations of the various parts have been fully described in the foregoing description relating to the construction thereof and further exposition of the operation is therefore deemed unnecessary.

Having described my invention I claim as new and desire to protect by Letters Patent of the United States:—

1. A coasting and braking hub having in combination, a driver, an auxiliary driver arranged within the hub, brake mechanism, and means for clutching the driver to the auxiliary driver or to the brake mechanism.

2. A coasting and braking hub having in combination, a driver, an auxiliary driver arranged within the hub, and brake mechanism, together with means for clutching the driver to the hub, to the auxiliary driver or to the brake mechanism.

3. A coasting and braking hub having in combination, a driver, an auxiliary driver within and geared to the hub, and brake mechanism, together with clutch mechanism for clutching the driver to the hub, to the auxiliary driver or to the brake mechanism, or for releasing the driver therefrom.

4. A coasting and braking hub having in combination, an auxiliary driver arranged within and geared to the hub, brake mechanism, and means for clutching the driver to the auxiliary driver or to the brake mechanism.

5. A coasting and braking hub having in combination, a main driver, together with means for clutching it to the hub, a brake actuator, an auxiliary driver, and an intermediate clutch element for connecting the main driver with the brake actuator or with the auxiliary driver.

6. A coasting and braking hub having in combination, a main driver together with means for clutching it to the hub, a brake actuator, an auxiliary driver, an intermediate clutch element for clutching the main driver to the brake actuator or to the auxiliary driver, a stop for holding said intermediate clutch element out of engagement with the auxiliary driver and means operated by back pedaling for releasing said stop.

7. A coasting hub having in combination, a main driver together with means for clutching it to the hub, an auxiliary driver, a friction clutch for connecting said main driver to said auxiliary driver, a stop to render said clutch inoperative, and means operated upon back pedaling for releasing said stop.

8. In a device of the character indicated, the combination with a driven hub, of a main driver, an auxiliary driver, operative connection between said main driver and said hub and between said auxiliary driver and said hub, a laterally shiftable clutch for operatively connecting and disconnecting said main driver and said auxiliary driver, and means whereby said clutch is shifted upon movement of said main driver.

9. A coasting hub having in combination, a main driver at one end thereof and an auxiliary driver at the other end, a clutch for connecting the main driver to the auxiliary driver operated by the forward turning of the main driver, a stop for rendering said clutch inoperative, and means operated upon the backward turning of the main driver to release said stop.

10. A coasting and braking hub having in combination, a main driver at one end thereof, brake mechanism and an auxiliary driver at the other end, and means for frictionally clutching the main driver to the brake mechanism or to the auxiliary driver.

11. A coasting and braking hub having in combination, a main driver at one end thereof, an auxiliary driver and brake mechanism at the other end, a sleeve extending from the main driver into the hub, and a clutch for connecting said sleeve with the auxiliary driver or with the brake mechanism.

12. A coasting hub having in combination, a main driver, an auxiliary driver, brake mechanism, and a laterally movable clutch member for connecting the main driver to the auxiliary driver or to the brake mechanism.

13. A coasting hub having in combination, a main driver, an auxiliary driver, clutch members movable laterally upon the forward turning of the main driver to connect the main driver with the auxiliary driver or with the hub, together with means for stopping the lateral movement of the one clutch member before the other has completed its travel.

14. A coasting hub having in combination, a main driver located at one end of the hub, a clutch for connecting said driver to the hub, auxiliary driving mechanism at the opposite end of the hub consisting of an auxiliary driving element provided with pinions which engage respectively with gear teeth upon a fixed support and gear teeth within and rigid with the hub, and a clutch for connecting together the main driver and the auxiliary driving element.

15. A coasting hub having in combination, a main driver located at one end thereof, an auxiliary driver at the opposite end thereof, sleeves extending from said main driver and from said auxiliary driver into the hub, and means comprising a friction clutch for clutching said sleeves together.

16. A hub having in combination, a main driver, an auxiliary driver, a clutch member for connecting the main driver and auxiliary driver operated by the forward turning of the main driver, and a stop for engaging such clutch member before it comes into operative relation with the auxiliary driver.

17. A hub having in combination, a main driver, an auxiliary driver, a clutch member operated by the forward turning of the main driver to clutch the main driver and auxiliary driver together, a stop for holding the clutch member out of engagement with the auxiliary driver, and means operated by the backward turning of the main driver for controlling said stop.

18. A coasting hub having in combination, a main driver, an auxiliary driver, a sleeve extending from said main driver into the hub, clutches mounted upon said sleeve and operated by the forward turning of the main driver for connecting the driver with the hub or with the auxiliary driver, and a stop controlled by the main driver for rendering the clutch between the driver and auxiliary driver inoperative.

19. The combination with a hub, of a driving member, operative connection between the same and said hub, an auxiliary driving member within the hub, operative connection between said auxiliary driving member and said hub, and means actuated by and slidable on said driving member for releasably connecting said driving member and said auxiliary driving member.

20. The combination with driving and driven members, of an auxiliary driving member, a brake mechanism, and a clutch actuated by the driving member and having one face coöperating with said brake mechanism and another face coöperating with said auxiliary driving member, whereby said driving member can be releasably connected with either said brake mechanism or said auxiliary driving member.

21. The combination with a driven and a driving member, of means for connecting the driving member directly to the driven member, an intermediate driving connection adapted to engage the driven member, means for permitting the driving connection to nest in the aforesaid means, and means nesting within the first-named means and within the driving connection for releasably securing the latter and the driving member together.

22. The combination with driven and driving members, of an intermediate driving connection, a brake mechanism, means for releasably securing the brake mechanism or the driving connection to the driving member, and means independent of the first-named means for directly connecting the driving and driven members.

23. The combination with driving and driven members, of an intermediate driving member, means for releasably connecting the driving and intermediate driving members, and a stop member movable toward and from the driving member for permitting or preventing the releasable connection.

24. The combination with driving and driven members, of an intermediate driving member, means for releasably connecting the driving and intermediate driving member, and means carried by the first-named means and engaging one of the members for impeding the rotation of said first-named means.

25. The combination with driving and driven members, of an intermediate driving member, means adjacent the intermediate member for connecting the latter to the driving member, and means carried by the first-named means and frictionally engaging the intermediate driving member to prevent rotative movement of the first-named means with respect to said intermediate driving member.

26. The combination with driving and driven members, of an intermediate driving member, means for releasably connecting the driving and intermediate driving members, means movable in opposite directions for preventing or permitting the operation of the first-named means, and means normally tending to force the controlling means to one limit of its movement.

27. The combination with driving and driven members, of an intermediate driving member, a braking mechanism having a seat therein, a resilient member received in the seat, means for releasably connecting the driving and intermediate driving members, and a controller movable in opposite directions for permitting or preventing the actuation of said means, the resilient member engaging the controller.

28. In a vehicle, the combination with driving and driven members, of an intermediate driving connection, a grooved means for releasably securing the driving member and intermediate connection together, a controller, and means on the controller received in the groove in the first named means, the controller being actuated from the driving member to release the first-named means.

29. In a vehicle, the combination with driving and driven means, of an intermediate driving connection, means carried by and traveling longitudinally in either direction upon the driving means for connecting the driving means and the intermediate driving connection, and similar means also carried by and traveling upon the driving means for directly connecting the driving and driven means.

30. In a vehicle, the combination with driving and driven members, of an intermediate driving connection, longitudinally traveling means for securing the driving member and driving connection releasably together, and a controller movable in a path parallel with the path of movement of said means, the controller being adapted to releasably engage said means and permit or prevent the coupling of the driving member and connection.

31. In a vehicle, the combination with driving and driven members, of an intermediate driving connection, means for connecting the driving member and connection, and a non-rotatable controller for permitting or preventing the operation of said means.

32. In a vehicle, the combination with driving and driven members, of an intermediate driving connection within the driven member, means for releasably securing the connection to the driving member, and a controller telescoping relative to the driving member for permitting or preventing the operation of the said means.

33. In a vehicle, the combination with driving and driven members, of an intermediate driving connection, means for releasably securing the connection to the driving member, a controller, one end of which engages the said means, the opposite end of the controller being recessed, and a similarly recessed member engaged by the recessed end of the controller, the recessed member being operable by the driving member.

34. In a vehicle, the combination with driving and driven members, of an intermediate driving connection, means for releasably connecting the driving member and connection, a controller loosely engaging the said means and recessed at one end, a similarly recessed member opposing the recessed end of the controller, and means carried by the recessed member and engaging the driving member for rotating the former.

35. In a vehicle, the combination with driving and driven members, of an intermediate driving connection, means for releasably connecting the driving member and connection, a controller engaged by the means and recessed at one end, a similarly recessed member opposing the recessed end of the controller, means for rotating the recessed member relative to the controller, and means for impeding the rotation of the recessed member.

36. In a vehicle, the combination with driving and driven members, of an intermediate driving connection within the driven member, means for releasably connecting the driving member and connection, a controller engaged by said means and permitting or preventing the operation thereof, and a means engaged by the controller and rotatable with respect thereto for governing the actuation of the controller.

37. The combination in a vehicle, with driving and driven members, of an intermediate connection, means releasably connecting the driving member and connection, a longitudinally movable controller engaged by the means and permitting or preventing its operation in one direction, means rotatable with respect to the controller and engaged thereby for permitting longitudinal movement thereof, and means carried by the rotatable means and engaged by the driving member when the latter is rotated in one direction for releasably locking the driving member and rotatable means together.

38. The combination with driving and driven members, of the following elements confined within the driven member: an intermediate connection, means for releasably connecting the driving member and connection together, and means controlled by the driving member for permitting or preventing the operation of said first-named means.

39. A gearing for vehicles comprising driving and driven members, an intermediate connection within the driven member, a brake mechanism, means carried and operated by the driving member for connecting the brake mechanism or the intermediate connection to the driving member, and means under the control of the driving member for permitting or preventing the operation of the first-named means to connect the intermediate connection with the driving member.

40. A multiple speed gearing comprising a driven member, a driving member extending part-way therethrough, an intermediate driving connection within the driven member, and means actuated by the driving member for connecting the latter either to the driven member or to the intermediate connection.

41. A multiple speed gear comprising a hub, a driving member extending part-way thereacross, an intermediate driving connection within the hub, and means carried and actuated by the driving member for connecting the latter directly to the intermediate driving connection.

42. In a variable speed mechanism, the combination of a driving element, a driven element, an intermediate driving connection within the driven element, means for releasably connecting the intermediate connection to the driving element, a controller for permitting or preventing the operation of the means in one direction, and means for positively actuating the controller in one direction.

43. In a variable speed mechanism, the combination with a driven member provided with a braking hub, of internal teeth carried by the hub, a driving member, an intermediate driving connection adapted to engage the teeth on the braking hub, brake mechanism, and means for connecting the driving member with the brake mechanism or with the intermediate connection.

44. A coasting and braking mechanism comprising a driving member, a driven member, an intermediate driving connection within the driven member and actuated by the driving member and engaging the driven member, brake mechanism, and means for connecting the driving member to the driving connection or to the brake mechanism.

45. A coasting and braking device comprising a driving member, a driven member, an intermediate driving connection within the driven member in engagement with the driven member and actuated by the driving member, a brake mechanism, and means for releasably connecting the driving and driven members directly, the driving and intermediate driving members, or the driving member and brake mechanism.

46. A device of the character described comprising a driving member, a driven member, an intermediate driving connection in engagement with the driven member, a brake mechanism, and means within the driven member for releasably connecting the driving member directly with the driven member, or to the intermediate driving connection or to the brake mechanism, or for releasing the driving member therefrom.

47. A mechanism comprising a driving member, a driven member, an intermediate driving connection geared to the driven member, brake mechanism, and means within the driven member for releasably connecting the driving member to the intermediate driving connection or to the brake mechanism.

48. A coasting and braking hub having in combination, a driver, an auxiliary driver arranged within the hub and geared thereto, clutch connections for connecting the driver with the hub or with the auxiliary driver, and a brake, substantially as described.

49. A coasting and braking hub having in combination, a driver, an auxiliary driver arranged within the hub and geared thereto, a brake mechanism, and clutch mechanisms for clutching the driver with the hub or with the auxiliary driver or with the brake mechanism, substantially as described.

50. The combination with a hub, a driving member, a shiftable driving connector adapted to operatively connect said driving member and said hub, and means whereby movement of said driving member serves to positively shift said connector into connecting position, of means for preventing movement of said connector into connecting position when said driving member is given connector-shifting movement.

51. The combination with a hub, a driving member, and driving connection between said hub and driving member, of a second driving connection between said hub and driving member and including a shiftable driving connector, means whereby movement of said driving member serves to positively shift said connector into driving position, and means for preventing movement of said connector into connecting position when said driving member is given connector-shifting movement.

52. The combination with a hub, a driving member, and driving connection between said hub and driving member, of a second driving connection between said hub and driving member and including a shiftable driving connector having threaded shifting connection with said driving member, whereby movement of said driving member can shift said connector into driving position, and means for preventing movement of said connector into connecting position when said driving member is given connector-shifting movement.

53. The combination with a hub, a driving member, and a brake, of a driving connection between said hub and driving member, a second driving connection between said elements and including a shiftable connector, and means whereby one character of back-pedaling of said driving member causes said connector to be shifted into driving position and another character of back-pedaling of said driving member causes said connector to operate said brake.

In testimony whereof I affix my signature, in presence of two witnesses.

ALBERT F. ROCKWELL.

Witnesses:
 CHAS. T. TREADWAY,
 DE WITT PAGE.